United States Patent
Yoshiike et al.

(10) Patent No.: US 8,212,839 B2
(45) Date of Patent: Jul. 3, 2012

(54) IMAGE CREATING DEVICE, IMAGE CREATING METHOD, INFORMATION RECORDING MEDIUM, AND PROGRAM

(75) Inventors: Hiroaki Yoshiike, Tokyo (JP); Shuyo Murata, Tokyo (JP); Yoji Shinkawa, Tokyo (JP); Takahiro Omori, Tokyo (JP)

(73) Assignee: Konami Digital Entertainment Co. Ltd., Tokyo (JP)

( * ) Notice: Subject to any disclaimer, the term of this patent is extended or adjusted under 35 U.S.C. 154(b) by 897 days.

(21) Appl. No.: 12/294,113

(22) PCT Filed: Mar. 22, 2007

(86) PCT No.: PCT/JP2007/055798
§ 371 (c)(1),
(2), (4) Date: Sep. 23, 2008

(87) PCT Pub. No.: WO2007/122952
PCT Pub. Date: Nov. 1, 2007

(65) Prior Publication Data
US 2009/0102860 A1     Apr. 23, 2009

(30) Foreign Application Priority Data
Mar. 30, 2006    (JP) ................... 2006-093810

(51) Int. Cl.
*G09G 5/00* (2006.01)
(52) U.S. Cl. ........................ 345/619; 345/423
(58) Field of Classification Search .......... 345/619, 345/423
See application file for complete search history.

(56) References Cited

U.S. PATENT DOCUMENTS

| | | | |
|---|---|---|---|
| 6,152,821 A | 11/2000 | Nakagawa et al. | |
| 2005/0012740 A1 | 1/2005 | Takahashi et al. | |
| 2006/0075885 A1* | 4/2006 | Bailey et al. ............... | 84/630 |

FOREIGN PATENT DOCUMENTS

| | | |
|---|---|---|
| EP | 0454129 A | 10/1991 |
| EP | 0807903 A | 11/1997 |
| EP | 1029569 A | 8/2000 |
| EP | 1271413 A | 1/2003 |
| JP | 2003-090729 A | 3/2003 |
| JP | 2004-154449 A | 6/2004 |
| JP | 2005-038298 A | 2/2005 |
| TW | 459209 B | 10/2001 |
| WO | WO 03-090887 A1 | 11/2003 |

OTHER PUBLICATIONS

International Search Report PCT/JP2007/055798 dated May 1, 2007.
European Search Report EP07739241 dated Jun. 5, 2009, 5 pages.
Office Action for counterpart Taiwanese Patent Application No. 096111033 mailed on Mar. 12, 2010 and English Translation, 8 pages.
Search Report for counterpart Taiwanese Patent Application No. 096111033 mailed on Mar. 12, 2010 and English Translation, 2 pages.

* cited by examiner

*Primary Examiner* — Maurice L McDowell, Jr.
(74) *Attorney, Agent, or Firm* — Howard & Howard Attorneys PLLC

(57) ABSTRACT

In an image creating device (201) for creating an image viewably showing the distribution of environment parameters in a virtual space, a parameter acquiring unit (202) acquires environment parameters at a predetermined plurality of places in a virtual space, and an image creating unit (203) creates an image based on the acquired environment parameter. The image creating unit (203) creates, for each of the predetermined plurality of places in the virtual space, an image showing a graphic drawn at a position within the image, the position being associated with the place and associated with the environment at the place.

9 Claims, 7 Drawing Sheets

IMAGE CREATING DEVICE, IMAGE CREATING METHOD, INFORMATION RECORDING MEDIUM, AND PROGRAM

TECHNICAL FIELD

The present invention relates to an image creating device and an image creating method suitable for creating an image viewably showing the distribution of an environment parameter in a virtual space, a computer readable information recording medium storing a program for realizing these on a computer, and the program.

BACKGROUND ART

Conventionally, various types of techniques for presenting various parameters to a player in a game have been proposed. Such a technique has been disclosed in, for example, the following literature.

Patent Literature 1: International Publication No. WO03/090887

Here, in Patent Literature 1, there has been disclosed a technique for detecting an environment parameter, converting the environment parameter to a consumption-type parameter, storing the amount of the converted consumption-type parameter in memory, and displaying the amount on a display. Additionally, techniques such as displaying an arrow in the direction of an enemy character or in the direction of an item for clearing a mission of the game are also widely employed.

DISCLOSURE OF THE INVENTION

Problem to be Solved by the Invention

Nevertheless, there has been a great demand for presentation of the distribution of and change in an environment parameter in a virtual space to the player in an easy-to-understand manner.

The present invention has been made to overcome such problems, and it is an object of the present invention to provide an image creating device and an image creating method suitable for creating an image viewably showing the distribution of an environment parameter in a virtual space, a computer readable information recording medium storing a program for realizing these on a computer, and the program.

Means for Solving the Problem

To achieve the above objective, the following will be disclosed according to the principles of the present invention.

An image creating device according to a first aspect of the present invention comprises a parameter acquiring unit and an image creating unit, and is constituted as follows.

That is, the parameter acquiring unit acquires environment parameters at a predetermined plurality of places in a virtual space.

The simplest environment parameter is the location of a character or target item, where the numeric value of the environment parameter of the location where the character or target item exists is increased. Various parameters can be adopted as the environment parameter, such as the volume of sound produced in the location where a character exists, the amount of heat radiated from a heat source or the temperature difference, the slope or elevation difference of the ground, the ground resistance when walking, or the stress level, physical strength, attack power, or defensive power of a character.

On the other hand, the image creating unit creates an image based on the acquired environment parameter, with the image showing for each of the predetermined plurality of places in the virtual space a graphic associated with an environment parameter at the place and drawn at a position within the image, the position being associated with the place.

The association between each of the plurality of places in the virtual space and the respective associated positions therein is exactly equivalent to the association between the ground surface of the real world and a map. The association may be one such as a reduced simplified map of the virtual space, or one that maintains some type of topological quality, such as when the surface of the earth is shown on a planar map, for example.

The graphic associated with the environment parameter is typically a graphic that changes in size, color, and shape in accordance with the value of the environment parameter and, as described later, the image created is preferably a dynamic image that employs a display technique that makes it possible for the user to intuitively grasp the value of the environment parameter.

According to the present invention, it is possible to create an image viewably showing the distribution of an environment parameter in a virtual space.

Further, the image creating device of the present invention may be configured so that the predetermined plurality of places in the virtual space are determined so as to be distributed based on the position of the character operated by the player in the virtual space.

For example, in a game where the player (user) moves a character in a virtual space, the distribution of an environment parameter is presented by displaying a graphic associated with the environment parameter on a "map" centered around the character.

Then, generally a predetermined range is employed as the area displayed within the "map," and the area displayed as the "map" moves when the character moves.

According to the present invention, it is possible to create an image viewably showing the distribution of an environment parameter in a virtual space, centering around the character operated by the user.

Further, the image creating device of the present invention may be configured so that each of the predetermined plurality of places in the virtual space is exclusively associated with one of a plurality of sections that divide the virtual space; for each of the predetermined plurality of places in the virtual space, the parameter acquiring unit acquires the inflow and outflow direction of an environment parameter that flows in and out between neighboring sections for the sections associated with the place in the virtual space; and the image creating unit creates as the image a dynamic image in which, for each of the predetermined plurality of places in the virtual space, the graphic vibrates in the inflow and outflow direction of the environment parameter based on a position within the image, the position being associated with the place.

Each of the plurality of sections is typically a grid square obtained by dividing the ground in the virtual space into square blocks, and the place associated with the section is at the center of the grid square.

In a case where the environment parameter of each grid square flows in and out between neighboring grid squares, that is, in a case related to the volume of sound produced by a character, etc., the amount of heat generated from a heat source or a temperature difference, or the stress level, etc., of a character, for example, often the direction and volume of inflow and outflow are preferably presented.

Here, the parameter acquiring unit acquires the total volume and the direction of inflow and outflow of the environment parameter between the neighboring sections for each section.

The processing of the present invention corresponds to analyzing the approximate values of a vector field $E(r)$, a scalar potential $V(r)$ thereof, and a source $\rho(r)$ having a relationship with a position vector r such as follows:

$$E(r) = -\text{grad } V(r);$$

$$\rho(r) = \text{div } E(r)$$

Here, the environment parameter corresponds to $V(r)$, the total volume of inflow and outflow of the environment parameter corresponds to $\rho(r)$ and $|E(r)|$, and the direction of inflow and outflow of the environment parameter corresponds to the direction of $E(r)$.

Then, a dynamic image in which the graphic vibrates in the direction of inflow and outflow of the environment parameter (corresponding to the direction of $E(r)$) is created.

According to the present invention, it is possible to create an image that viewably shows the direction of movement of an environment parameter determined by the distribution of the environment parameter in a virtual space.

Further, the image creating device of the present invention may be configured so that the image creating unit creates as the image a dynamic image in which, for each of the predetermined plurality of places in the virtual space, the graphic vibrates in a predetermined direction at a vibration amplitude associated with the environment parameter at the place, based on a position within the image, the position being associated with the place.

The present invention is according to the preferred embodiments of the above-described invention and, when described using the above example, determines the amplitude of the vibration according to the value of the environment parameter (corresponding to $V(r)$), and the total volume of inflow and outflow (corresponding to $\rho(r)$ and $|E(r)|$).

According to the present invention, it is possible to create an image that viewably shows the change in the size of distribution of an environment parameter in a virtual space by the amplitude at which the graphic vibrates.

Further, the image creating device of the present invention may be configured so that the image creating unit creates as the image a dynamic image in which, for each of the predetermined plurality of places of the virtual space, at least either the brightness or color of the graphic changes at either the vibration amplitude or time cycle associated with the environment parameter of the place.

The present invention is according to the preferred embodiments of the above-described invention and, when described using the above example, determines the vibration amplitude and time cycle of the flickering or color change according to the value of the environment parameter (corresponding to $V(r)$), and the total volume of inflow and outflow (corresponding to $\rho(r)$ and $|E(r)|$).

According to the present invention, it is possible to create an image that viewably shows the change in the size of distribution of an environment parameter in a virtual space by the vibration amplitude and time cycle of the brightness and color change.

An image creating method according to another aspect of the present invention is executed on an image creating device comprising the parameter acquiring unit and image creating unit, and includes a parameter acquiring step and an image creating step, which are configured as follows.

That is, in the parameter acquiring step, the parameter acquiring unit acquires environment parameters at a predetermined plurality of places in a virtual space.

On the other hand, in the image creating step, the image creating unit creates an image based on the acquired environment parameter.

Further, in the image creating step, for each of the predetermined plurality of places in the virtual space, an image showing a graphic drawn at a position associated with the place and associated with the environment parameter of the place is created.

A program according to another aspect of the present invention is constituted so as to cause a computer to function as the image creating device described above, and to execute the image creating method described above on the computer.

The program of the present invention can be recorded on a computer readable information recording medium, such as a compact disk, a flexible disk, a hard disk, a magneto-optical disk, a digital video disk, a magnetic tape, or a semiconductor memory.

The program can be distributed and sold, independently of a computer which executes the program, over a computer communication network. The information recording medium can be distributed and sold independently of the computer.

Effect of the Invention

According to the present invention, it is possible to provide an image creating device and an image creating method suitable for creating an image viewably showing the distribution of an environment parameter in a virtual space, a computer readable information recording medium storing a program for realizing these on a computer, and the program.

DESCRIPTION OF REFERENCE NUMERALS

Figure 1:
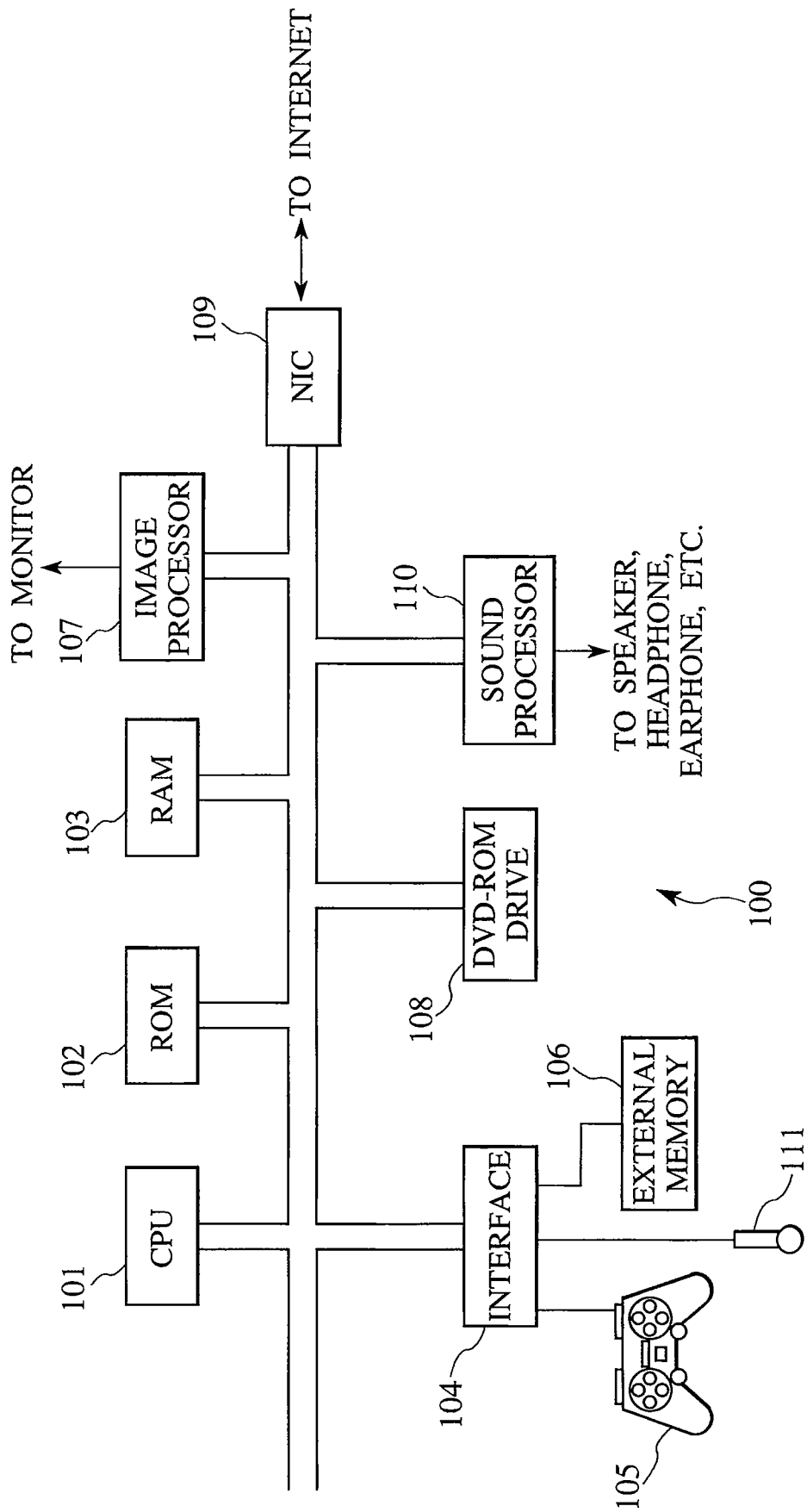
FIG. 1 is an exemplary diagram illustrating the schematic configuration of a typical information processing device that carries out the function of an image creating device of the embodiment by executing a program.

100 information processing device
101 CPU
102 ROM
103 RAM
104 interface 105 controller
106 external memory
107 image processor
108 DVD-ROM drive
109 NIC
110 sound processor
111 mic
201 image creating device
202 parameter acquiring unit
203 image creating unit
301 ground of virtual world
302 grid square
401 inflow vector for grid square
402 inflow vector from neighbor
403 inflow vector from neighbor
404 inflow vector from neighbor
405 inflow vector from neighbor
406 Outflow vector to neighbor
407 Outflow vector to neighbor
408 Outflow vector to neighbor
409 Outflow vector to neighbor
701 circle
702 center of circle

BEST MODE FOR CARRYING OUT THE INVENTION

An embodiment of the present invention will be described below. The embodiment to be described below is given by way of illustration only, and does not limit the scope of the invention. Therefore, persons skilled in the art can employ embodiments in which the individual elements or all the elements are replaced with equivalent ones, and which are also encompassed in the scope of the invention.

Embodiment 1

FIG. 1 is an exemplary diagram illustrating the schematic configuration of a typical information processing device that carries out the function of an image creating device of the present invention by executing a program. A description is given below with reference to this drawing.

An information processing device 100 comprises a CPU (Central Processing Unit) 101, a ROM 102, a RAM (Random Access Memory) 103, an interface 104, a controller 105, an external memory 106, an image processor 107, a DVD-ROM (Digital Versatile Disc ROM) drive 108, an NIC (Network Interface Card) 109, a sound processor 110, and a mic 111.

As a DVD-ROM storing a program and data for a game is loaded into the DVD-ROM drive 108 and the information processing device 100 is powered on, the program is executed to realize the image creating device of the embodiment.

The CPU 101 controls the general operation of the information processing device 100, and is connected to individual components to exchange a control signal and data therewith. Further, by using an ALU (Arithmetic Logic Unit) (not shown), the CPU 101 can perform arithmetic operations such as addition, subtraction, multiplication, division, etc., logical operations such as logical addition, logical multiplication, logical negotiation, etc., bit operations such as bit addition, bit multiplication, bit inversion, bit shift, bit rotation, etc., on a storage area, or a register (not shown) which can be accessed at a high speed. Furthermore, the CPU 101 itself may be designed to be able to rapidly perform saturate operations such as addition, subtraction, multiplication, division, etc., for handling multimedia processes, vector operations such as trigonometric function, etc., or may realize these with a coprocessor.

An IPL (Initial Program Loader) which is executed immediately after power-on is recorded in the ROM 102. As the IPL is executed, the program recorded in the DVD-ROM is read into the RAM 103 and is executed by the CPU 101. Further, the RAM 102 stores a program and various data for an operating system necessary for controlling the overall operation of the information processing device 100.

The RAM 103 is for temporarily storing data and programs, and retains the program and data read out from the DVD-ROM, and other data needed for progressing a game and chat communication. Further, the CPU 101 performs processes such as securing a variable area in the RAM 103 to work the ALU directly upon the value stored in the variable to perform operations, or once storing the value stored in the RAM 103 in the register, performing operations on the register, and writing back the operation result to the memory, etc.

The controller 105 connected via the interface 104 accepts an operation input which is made when a user executes the game.

The external memory 106 detachably connected via the interface 104 rewritably stores data indicating the play status (past performance, etc.) of a game, etc., data indicating the progress status of the game, data of chat communication logs (records) in the case of a network match-up game, etc. As the user makes an instruction input via the controller 105, these data can adequately be recorded in the external memory 106.

The program for realizing the game and the image data and sound data accompanying the game are recorded in the DVD-ROM to be loaded into the DVD-ROM drive 108. Under the control of the CPU 101, the DVD-ROM drive 108 performs a process of reading from the DVD-ROM loaded therein to read a necessary program and data, and these are temporarily stored in the RAM 103 or the like.

The image processor 107 processes data read from the DVD-ROM by means of the CPU 101 and an image operation processor (not shown) the image processor 107 has, and then records the data in a frame memory (not shown) in the image processor 107. The image information recorded in the frame memory is converted to a video signal at a predetermined synchronous timing, which is in turn output to a monitor (not shown) connected to the image processor 107. Image displays of various types are therefore possible.

The image operation processor can enable fast execution of an overlay operation of a two-dimensional image, a transparent operation like a blending, and various kinds of saturate operations.

It is also possible to enable fast execution of an operation of rendering polygon information which is arranged in virtual three-dimensional space and to which various kinds of texture information are added, by a Z buffer scheme to acquire a rendered image with a downward view of a polygon toward a predetermined view point position, arranged in the virtual three-dimensional space, from the predetermined view point position.

Further, the CPU 101 and the image operation processor cooperate to be able to write a string of characters as a two-dimensional image in the frame memory or on each polygon surface according to font information which defines the shapes of characters.

The NIC 109 serves to connect the information processing device 100 to a computer communication network (not shown), such as the Internet or the like. The NIC 109 is pursuant to the 10 BASE-T/100 BASE-T standard which is used at the time of constructing a LAN (Local Area Network) for example, or it is comprised of such as an analog modem for connecting to the Internet using a telephone circuit, an ISDN (Integrated Services Digital Network) modem, an ADSL (Asymmetric Digital Subscriber Line) modem, a cable model for connecting to the Internet using a cable television circuit, or the like, and of an interface (not shown) which intervenes between the CPU 101 and any one of such modems.

The sound processor 110 converts sound data read from the DVD-ROM to an analog sound signal, and outputs the sound signal from a speaker (not shown) connected thereto. Under the control of the CPU 101, the sound processor 109 generates sound effects and music data to be generated during progress of the game, and outputs sounds corresponding thereto from a speaker.

In a case where the sound data recorded on the DVD-ROM is MIDI data, the sound processor 110 refers to the sound source data included in the data, and converts the MIDI data to PCM data. Further, in a case where the sound data is compressed sound data of ADPCM format or Ogg Vorbis format, etc., the sound processor 110 expands the data, converting it to PCM data. The PCM data is D/A (Digital/Analog) converted at a timing corresponding to the sampling frequency of the data and output to the speaker, thereby enabling sound output.

Further, the information processing device 100 can be connected to the mic 111 via the interface 104. In this case, A/D conversion is performed on the analog signal from the mic 111 at an appropriate sampling frequency, thus making it possible to perform mixing, etc., with the sound processor 110 using a PCM-type digital signal.

In addition, the information processing device 100 may be configured to achieve the same functions as the ROM 102, the RAM 103, the external memory 106, and the DVD-ROM which is to be loaded into the DVD-ROM drive 108 or the like by using a large-capacity external storage device, such as a hard disk.

The information processing device 100 discussed above is equivalent to a so-called "consumer-oriented television game apparatus," but anything which performs sound processing or image processing can realize the present invention. Accordingly, the present invention can be realized on a variety of computational machines, such as portable telephones, portable game devices, karaoke apparatuses, common business computers, and so on.

For example, the ordinary computer, like the image processing device 100, has a CPU, a RAM, a ROM, a DVD-ROM drive, an NIC, a sound input mic, and sound output speaker, has an image processor having simpler functions than the information processing device 100, and can use a flexible disk, magneto-optical disk, a magnetic tape or the like in addition to a hard disk as an external storage device. The keyboard, mouse or the like, not a controller, is used as an input device.

Figure 2:
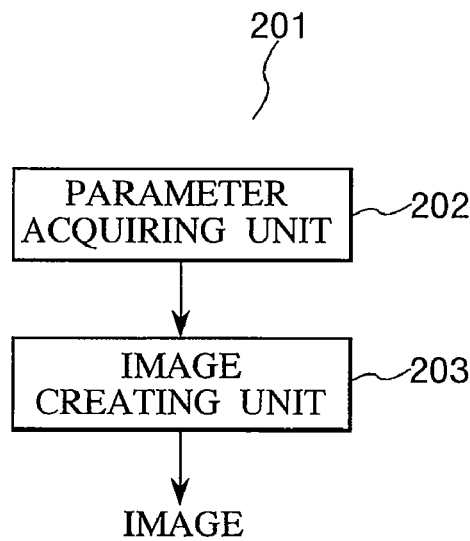
FIG. 2 is an exemplary diagram illustrating the schematic configuration of an image creating device of the embodiment.

FIG. 2 is an exemplary diagram illustrating the schematic configuration of an image creating device according to one embodiment of the present invention. A description is given below with reference to this drawing.

An image creating device 201 of the embodiment comprises a parameter acquiring unit 202 and an image creating unit 203.

That is, the parameter acquiring unit 202 acquires environment parameters at a predetermined plurality of places in a virtual space.

The simplest environment parameter is the location of a character or target item, where the numeric value of the environment parameter of the location where the character or target item exists is increased. In such a case, as the position of the place nears the location where the character or target item exists, the numeric value of the environment parameter of that direction increases.

Various parameters can be adopted as the environment parameter, such as the volume of sound produced in the location that a character exists, the amount of heat radiated from a heat source or the temperature difference, the slope or elevation difference of the ground, the ground resistance when walking, or the stress level, physical strength, attack power, or defensive power of a character.

(Two-Dimensional Distribution of Environment Parameter)

Figure 3:
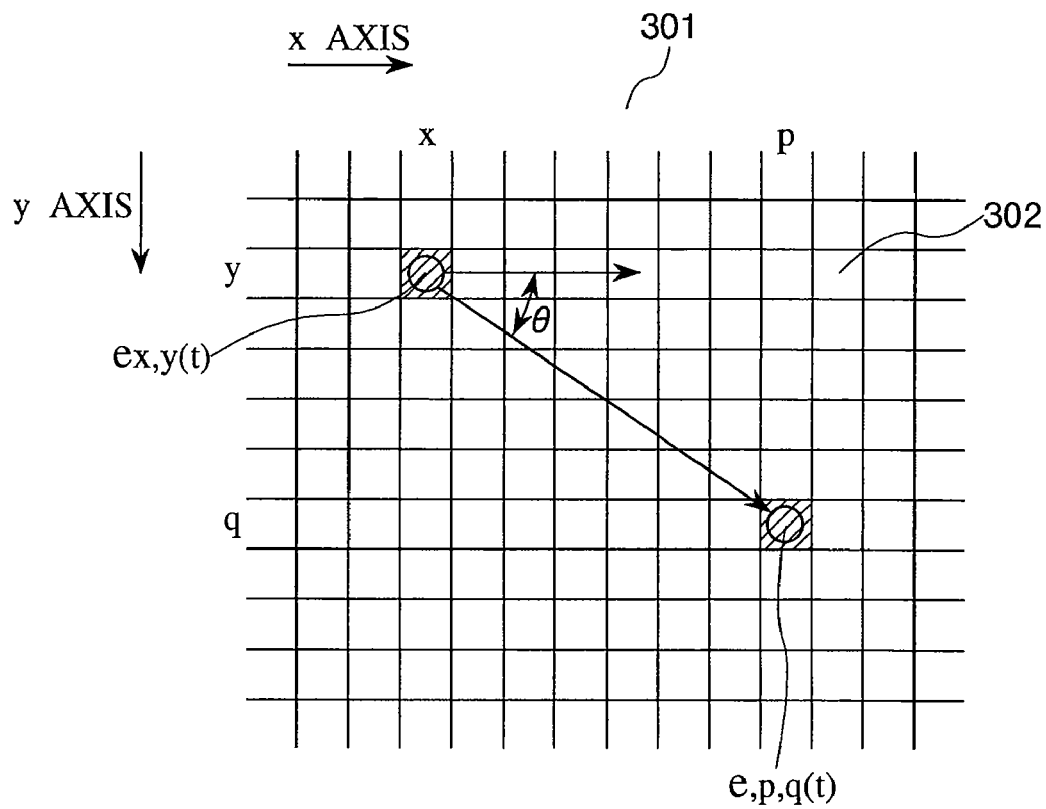
FIG. 3 is an explanatory diagram showing the management of environment parameter distribution information in the virtual world.

FIG. 3 is an explanatory diagram showing the management of environment parameter distribution information in the virtual world. A description is given below with reference to this drawing.

As shown in the figure, a ground 301 of a virtual world is marked by a grid square 302 of two dimensions divided into an x-axis direction and a y-axis direction. The center position of a section expressed by each grid square 302 and one of the established corner peaks, etc., are considered positions of representative points of the grid square 302.

Accordingly, the immediate value $e_{p,q}(t)$ of an environment parameter at a certain time at a pair of coordinates (p, q) in the virtual world is typically stored in element e[p][q] of a two dimensional array e[ ][ ], or in e[p/D][q/D] using a predetermined grading width D ($D \geq 1$) and integer division. An explanation is provided in the following with D=1.

While in the embodiment the ground 301 of the virtual world is marked by sections by a square-block type grid square 302 as described above, the shape of the sections is arbitrary. For example, the sections may be triangles having the same shape to the extent possible, as is used in the finite element method, or regular hexagons as is employed in a strategy or war board type simulation game.

Given that the position of the character on which the player is focused is on the grid square 302 of the pair of coordinates (x, y), the direction toward certain pair of coordinates (p, q) from the character (angle θ formed with axis x) can be obtained in such a manner that:

$$\theta = \arctan[(q-y)/(p-x)]; \text{ or:}$$

$$\cos\theta = (p-x)/[(p-x)^2+(q-y)^2]^{1/2},$$

$$\sin\theta = (q-y)/[(p-x)^2+(q-y)^2]^{1/2}$$

Under such conditions, consider a technique wherein locations where an enemy character possibly exists are distributed two dimensionally as an environment parameter.

The simplest method is a technique wherein the value $e_{i,j}$ of the environment parameter is set to 1 when an enemy character exists at a pair of coordinates (i, j), and set to 0 in any other case.

Nevertheless, there are also cases where the location of an enemy character is preferably expressed with a certain margin of error, depending on the game. For example, consider a case where the stress level of an enemy character is expressed by vibration such as a pulse, and the stress level based on that pulse is propagated to the surrounding area and introduced in waves as atmosphere.

Under such conditions, a technique wherein a recurrence formula for obtaining a value $e_{i,j}(t+1)$ of the environment parameter of the pair of coordinates (i, j) at a time t+1 from the value $e_{i,j}(t)$ of the environment parameter of the pair of coordinates (i, j) at the previous time t may be employed.

The time unit of t is, for example, set to the interval (approximately $\frac{1}{60}$ second) of a vertical synchronizing interrupt, which is a typical interval of a screen update of the information processing device 100.

That is, in a case where an enemy character k does not exist at pair of coordinates (i, j) at time t+1, using propagation constants $\alpha$ and $\beta$ where ($0 \leq \alpha, \beta, \alpha+\beta \leq 1$), then:

$$e_{i,j}(t+1) = \alpha e_{i,j}(t) + (\beta/4)[e_{i-1,j}(t) + e_{i+1,j}(t) + e_{i,j-1}(t) + e_{i,j+1}(t)]$$

When the subscript e is out of the predetermined two-dimensional array range, the value is set to 0.

$\alpha$ is the ratio of environment parameters that do not leak out of the area, and $\beta$ is the ratio of environment parameters that do leak out of the area. Typically, $\alpha > \beta$. When $\alpha + \beta = 1$, a wave that occurs will remain until it leaves the area (until it is out of the two-dimensional array range). When $\alpha + \beta < 1$, the wave will gradually attenuate.

With the above recurrence formula, the values of the environment parameter of the current position and the positions above, below, and to the left and right thereof determine the value of the environment parameter of the current position of the next moment.

Additionally, a form where the direction of propagation is given a bias by changing the appropriate coefficient, or where propagation by a predetermined coefficient from a diagonal grid square is also possible may also be employed. For example, using the propagation constants $\alpha$, $\beta$, and $\gamma$ where ($0 \leq \alpha, \beta, \gamma, \alpha+\beta+\gamma \leq 1$), then:

$$e_{i,j}(t+1) = \alpha e_{i,j}(t) + (\beta/4)[e_{i-1,j}(t) + e_{i+1,j}(t) + e_{i,j-1}(t) + e_{i,j+1}(t)] +$$
$$(\gamma/4)[e_{i-1,j-1}(t) + e_{i-1,j+1}(t) + e_{i+1,j-1}(t) + e_{i+1,j+1}(t)]$$

Here, typically $\alpha > \beta > \gamma$.

On the other hand, when the enemy character k exists at the pair of coordinates (i, j) at time t+1, given a parameter $P_k$ of the stress level of the character k and a predetermined cycle time constant T, then:

$$e_{i,j}(t+1) = P_k[1+\sin((t+1)/T)]$$

Since the cycle of a person's pulse is approximately one pulse per second, given 60 as the value T, this parameter is related to the pulse of the enemy character. Further, by decreasing T to the extent that the stress level $P_k$ increases, the level of stress can be more realistically expressed.

Additionally, a form where the above $P_k[1+\sin((t+1)/T)]$ is used in place of $\alpha e_{i,j}(t)$ is also possible. That is, in a case where the enemy character k exists at the pair of coordinates (i, j) at time t+1, then conditions are such that:

$$e_{i,j}(t+1) =$$
$$P_k[1+\sin((t+1)/T)] + (\beta/4)[e_{i-1,j}(t) + e_{i+1,j}(t) + e_{i,j-1}(t) + e_{i,j+1}(t)]$$

or:

$$e_{i,j}(t+1) =$$
$$P_k[1+\sin((t+1)/T)] + (\beta/4)[e_{i-1,j}(t) + e_{i+1,j}(t) + e_{i,j-1}(t) + e_{i,j+1}(t)] +$$
$$(\gamma/4)[e_{i-1,j-1}(t) + e_{i-1,j+1}(t) + e_{i+1,j-1}(t) + e_{i+1,j+1}(t)]$$

Additionally, a value other than:

$$P_k[1+\sin((t+1)/T)]$$

may be used as a function for expressing vibration. That is, because the vibration function $f(\cdot)$ of cycle T satisfies the following with respect to an arbitrary t:

$$f(t+T)=f(t)$$

an arbitrary function that satisfies this condition may be used in place of the above function.

While in the above example adjustments are made so that the displacement of vibration does not become a negative value, thereby ensuring that the height of a bar graph is never below a predetermined reference height when a bar graph is drawn as described later, the present invention is not particularly limited to a positive or negative vibration displacement since the height of the bar graph can be a negative value as well and, in such a case, the bar graph can advance in a negative direction.

Furthermore, the initial value at time t=0 may be set to a predetermined constant such as 0 when there is no enemy character.

Such propagation of the environment parameter may be carried out for a reason other than the presence of an enemy character. For example, a parameter such as "an item that generates divine energy", "a machine that produces sound", "the bustling of a city", "an odor", or "the degree to which the line of sight or detection of another character is blocked (sometimes referred to as a "baseline" in a game in which scouting is a theme)" may be utilized as the environment parameter and as the generation source of "waves."

Furthermore, as described above, when the environment parameter is shown as a numeric value, various display methods may be employed without necessarily requiring expression as a "pulse" or "wave" during display, even when the environment parameter can be shown as a "pulse" or "wave." A specific example of such a display method will be described below.

Figure 4A:
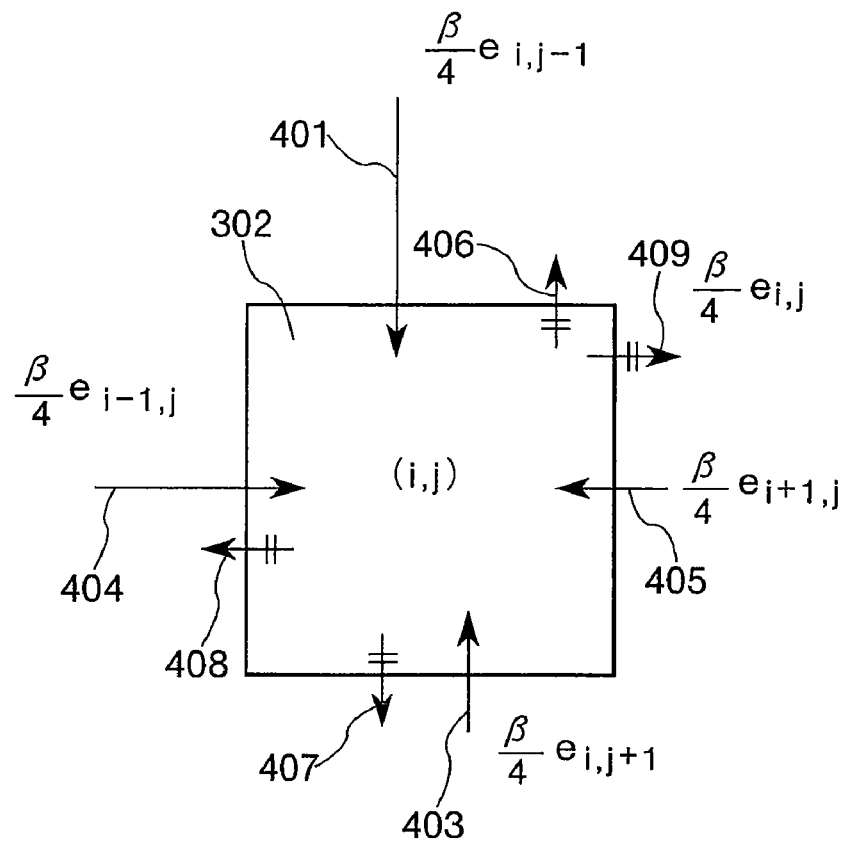
FIGS. 4A and 4B are exemplary diagrams showing the state of inflow and outflow of an environment parameter of a certain grid square.
Figure 4B:
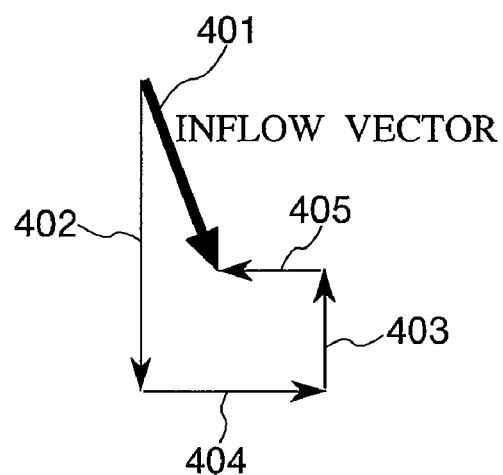

In a case where $e_{i,j}(t)$ is considered a "wave", the degree of inflow and outflow of each grid square is taken into consideration. FIGS. 4A and 4B are exemplary diagrams showing the state of inflow and outflow of an environment parameter of a certain grid square 302. The following describes a case where an environment parameter is propagated in the four directions described above, with reference to this drawing.

FIG. 4A shows the state of inflow and outflow of the environment parameter at the pair of coordinates (i, j).

As described above, the volume of inflow of the environment parameter from each of the neighboring grid squares 302 are respectively:

($\beta/4)e_{i-1,j}(t)$ from the left neighbor,
($\beta/4)e_{i+1,j}(t)$ from the right neighbor,
($\beta/4)e_{i,j-1}(t)$ from the upper neighbor, and
($\beta/4)e_{i,j+1}(t)$ from the lower neighbor.

On the other hand, the volume of the environment parameter flowing out from the grid square 302 is:

($\beta/4$)$e_{i,j}$(t) to the top, bottom, left, and right.

Thus, the "total volume of inflow" $f_{i,j}$(t) of the grid square 302 is:

$$f_{i,j}(t) = (\beta/4)e_{i-1,j}(t) + (\beta/4)e_{i+1,j}(t) + (\beta/4)e_{i,j-1}(t) + (\beta/4)e_{i,j+1}(t) - e_{i,j}(t)$$

A vector $v_{i,j}$(t) 401 expressing the inflow to the grid square 302 is the total sum of vectors 402, 403, 404, and 405 expressing the inflow from the neighboring top, bottom, left, and right grid squares 302, and vectors 406, 407, 408, and 409 expressing the outflow to the neighboring top, bottom, left, and right grid squares 302. FIG. 4B shows the relationship between the inflow vector $v_{i,j}$(t) and other vectors.

In this example, because the outflow from the grid square 302 is the average of all directions, the total sum of the vectors 406, 407, 408, and 409 is zero and, consequently, the inflow vector $v_{i,j}$(t) 401 is the total sum of the vectors 402, 403, 404, and 405 expressing the inflow from the neighboring top, bottom, left, and right grid squares 302.

Naturally, in an example where the outflow from the grid square 302 is not an average, the total sum of the vectors 406, 407, 408, and 409 will not necessarily be zero. In such a case, given that these are also included in the calculation of the vector sum, the inflow vector $v_{i,j}$(t) 401 can be obtained.

There are various techniques for dividing the section of the ground 301 of the virtual world. Thus, given that neighboring sections are suitably determined accordingly and that the vector of the direction expressing inflow and outflow is in a direction orthogonal to the boundary between sections, support of an arbitrarily shaped section is possible. Further, as described above, the volume of inflow and outflow at each boundary may be different or the same according to direction. In a case where the volume is different, the inflow vector $v_{i,j}$(t) 401 may be obtained from the total sum of the vectors expressing outflow and the vectors expressing inflow.

The "total volume of inflow" (or the sum of this value and $\alpha e_{i,j}$(t) and $P_k$[1+sin(t/T)] of the grid square 302) can be considered a volume equivalent to div A of vector field analysis pertaining to vector A, and the vector 401 can be considered equivalent to the vector A. Further, the value $e_{i,j}$(t) of the grid square 302 can be considered equivalent to the scalar potential-grad A of the vector A.

Additionally, the difference from the immediate value $e_{i,j}$(t) of the environment parameter of the grid square 302 may be expressed as:

$$\Delta e_{i,j}(t) = e_{i,j}(t+1) - e_{i,j}(t)$$

This can also be considered a volume equivalent to div A of vector field analysis pertaining to the vector A.

While the virtual world according to the ground 301 does not necessarily need to follow the actual laws of physics, showing the various environment parameters in the context of the actual laws of physics will make the distribution of those parameters easier for the player to understand. As described above, because various environment parameters can be grasped based on an analogy of a vector field (equivalent to an electromagnetic field, a field of fluid mechanics, and the like), the laws are helpful in enhancing the level of understanding of the player. Now, a technique for expressing the scalar volumes:

immediate value $e_{i,j}$(t);
total inflow volume $f_{i,j}$(t); and
difference $\Delta e_{i,j}$(t)

and the vector volume:
inflow vector $v_{i,j}$(t)
of the environment parameters using an image will be explained.

(Image Creating)

The image creating unit 203 creates an image, based on various environment parameters acquired as described above, such as:

immediate value $e_{i,j}$(t);
total inflow volume $f_{i,j}$(t);
difference $\Delta e_{i,j}$(t); and
inflow vector $v_{i,j}$(t)

Then, the image shows a graphic drawn at a position corresponding to the pair of coordinates (i, j) of the ground 301 in the virtual world and associated with these environment parameters. The association between the pair of coordinates (i, j) of the ground 301 of the virtual world and an inner position associated with the pair of coordinates (i, j) is exactly equivalent to the association between the ground surface of the real world and a map.

As described above, because the coordinates of the character operated by the player are (x, y), given that the character is placed at the center of the image in this embodiment, when a predetermined display width 2W (W≧1) and a predetermined display height 2H (H≧1) is used and the environment parameter according to the pair of coordinates (i, j) is as follows:

$$x-W \leq i \leq x+W, y-H \leq j \leq x+H$$

the image shows the area included in a rectangular region having a width 2W+1 and a height 2H+1, with the section where the character is located at the center.

With this arrangement, a technique where the distribution of the environment parameter of the area near the character in focus is the simplest. In the explanation that follows, W=H=2 is used for ease of understanding. Note, however, that rather than positioning the character in focus at the center, a form may be used wherein a predetermined area in the virtual space is set as the display area and a reference marker indicating the position of the character is shown superimposed on the generated image.

FIGS. 5A to 5E are explanatory diagrams showing an image in which a scalar environment parameter at a certain time t is drawn. A description is given below with reference to this drawing.

Figure 5A:
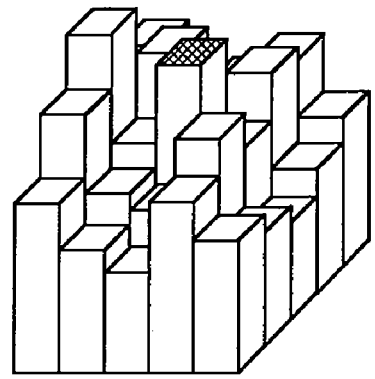
FIGS. 5A to 5E are explanatory diagrams showing an image in which a scalar environment parameter at a certain time t is drawn.

FIG. 5A sets the position within the image corresponding to the coordinates (i, j) using predetermined positive constants A, B, C, and D as follows:

$$(A(i-x+W)+B(j-y+H), C(i-x+W)+D(j-y+H))$$

In this figure, the rectangles are projected as parallelograms based on so-called coordinate transformation by linear transformation.

Thus, the square section of the ground 301 of the virtual world is projected as a parallelogram in this figure, resulting in an appearance similar to a perspective view of the virtual world.

Here, in FIG. 5A, a graphic in which the parallelogram resulting from the projection of the section that includes the pair of coordinates (i, j) of the ground 301 of the virtual world is swept upward by a length corresponding to the scalar environment parameter is drawn as a graphic indicating the environment parameter of the pair of coordinates (i, j).

With such an expression, after the environment parameter is expressed as a three-dimensional bar graph, an image showing a perspective view of the bar graph is obtained.

While in this figure the bars of the bar graph are drawn opaquely, the respective bars may be drawn translucently in a case where showing the overall state is preferred.

Further, in a case where the bars of the bar graph are to be shown as a dynamic image, a technique wherein the number of bars sequentially drawn increases from the back to the front of the bar graph may also be employed.

Figure 5D:
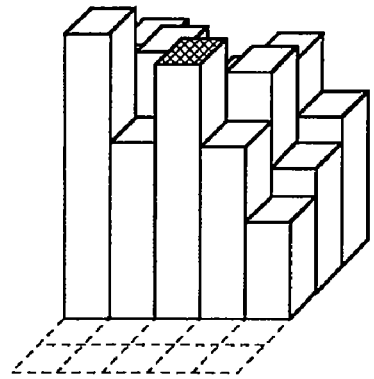
Figure 5B:
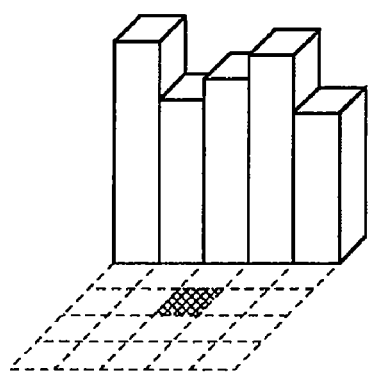
Figure 5E:
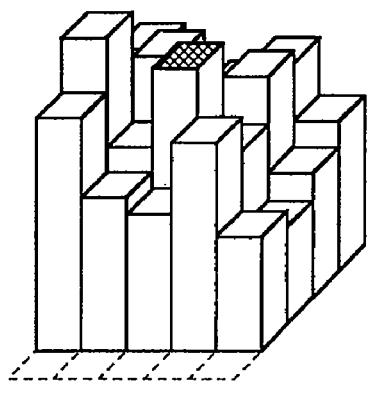
Figure 5C:
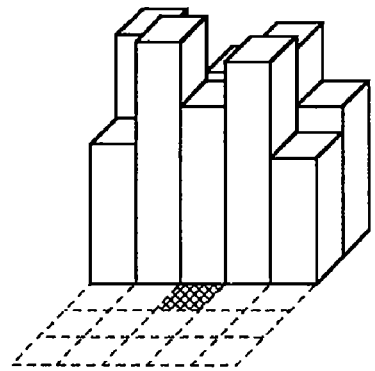

For example, in this figure, the dynamic image may be one where the bars are sequentially shown in the order of FIG. 5B→FIG. 5C→FIG. 5D→FIG. 5E→FIG. 5A→FIG. 5B→FIG. 5C→FIG. 5D→FIG. 5E→ . . . . At this time, the bar corresponding to the grid square 302 where the character in focus exists is easy for the player to understand when displayed using an appearance (color, brightness, etc.) that is different from the other bars.

Further, in the example shown in the figure, a graphic (surrounded by dotted lines in the figure) of the same shape as the ceiling of the bar graph is drawn on the "floor" where the bars of the bar graph are to appear so that those locations are understood. Also, the center graphic corresponds to the grid square 302 where the character in focus exists, and is therefore highlighted.

Furthermore, in this case, the update time interval of the dynamic image (the time period of one frame) is preferably shorter than the update time interval of the environment parameter. Additionally, with such a display, an animated display where each bar of the bar graph extends from the floor upward, stopping upon reaching the applicable value may also be employed.

Figure 6B:
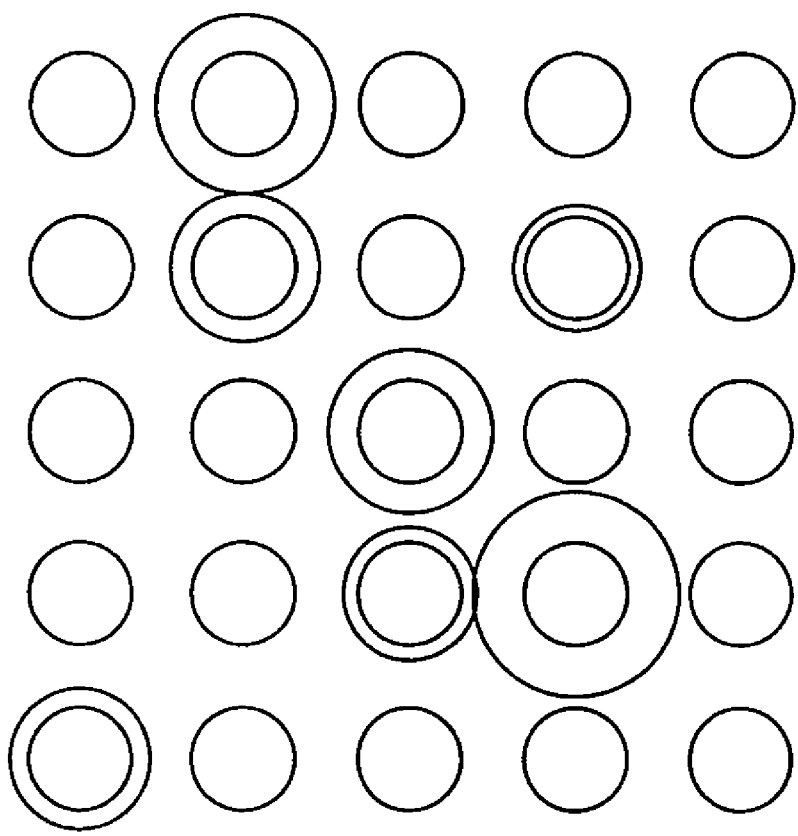
FIGS. 6A and 6B are explanatory diagrams showing an image in which a scalar environment parameter at a certain time t is drawn using another technique.
Figure 6A:
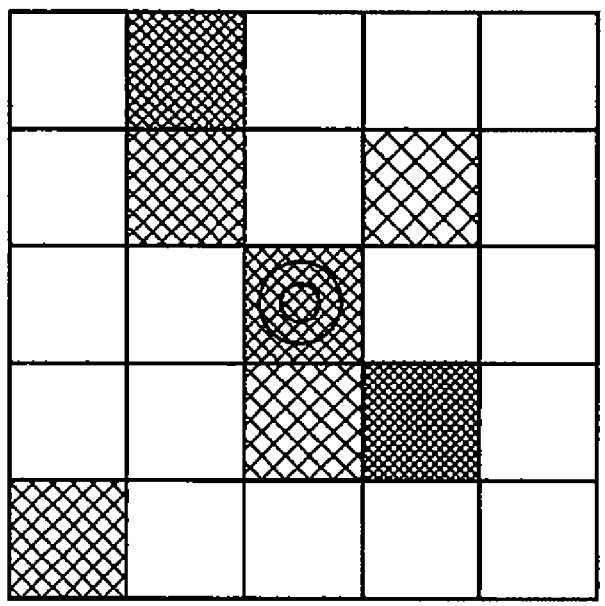

FIGS. 6A and 6B are explanatory diagrams showing an image in which a scalar environment parameter at a certain time t is drawn using another technique. A description is given below with reference to this drawing.

In the example shown in FIG. 6A, a square-block type area showing the grid square 302 of the ground 301 of the virtual world from above is shown in the image, and the brightness of the area surrounded by each square block is associated with the environment parameter of a first scalar.

At this time, the brightness cyclically vibrates and the vibration cycle is associated with the environment parameter of a second scalar, thereby making it possible to present two types of environment parameters to the player simultaneously. At this time, the environment parameter of the first scalar corresponds to the amplitude of the brightness vibration.

In the example shown in FIG. 6B, the placement associated with the ground 301 of the virtual space is the same as that of FIG. 6A, but a circle is shown as the graphic and the size of the circle is associated with the environment parameter of the first scalar.

In this case as well, a technique wherein the size of the circle is changed to make the circle appear as if it is vibrating and the cycle of this change is associated with the second environment parameter is conceivable as a technique for simultaneously displaying the second environment parameter.

Further, in these examples, rather than displaying the second environment parameter according to the cycle of vibration, the cycle of vibration may be associated with the first environment parameter as is. Further, the cycle of vibration may be constant as well.

In FIG. 6B, when the cycle of vibration is made constant, the degree to which the circle vibrates increases when the environment parameter is large, causing the circle to touch a neighboring circle. Thus, to the player it appears as if the circle came in contact with the neighboring circle, causing the vibration to propagate.

This display conforms to the above-described environment parameter model in which "the degree to which an environment parameter propagates to a neighboring section is proportionate to the size of the environment parameter of the section."

Furthermore, when a scalar environment parameter is to be displayed, it is possible to associate various properties that can be rendered, such as the various color components and degrees of saturation, degrees of transparency (a value), etc., in addition to brightness and size.

FIGS. 7A to 7E are partially enlarged views of an image presenting an environment parameter of a vector. Using a technique similar to that of FIG. 6B, the figure is based on a mode in which the environment parameter is displayed using aligned circles, focusing on the circle corresponding to a certain grid square 302. A description is given below with reference to this drawing.

While the size and color of a circle 701 shown in the figure can be determined, caused to vibrate, and made constant using the technique shown in FIGS. 6A and 6B, etc., the position of the circle 701 itself is also changed in the example of this figure. That is, the circle 701 is made to vibrate in the direction that includes the vector 401 of the grid square 302 corresponding to the circle 701 (refer to FIGS. 4A and 4B).

Figure 7A:
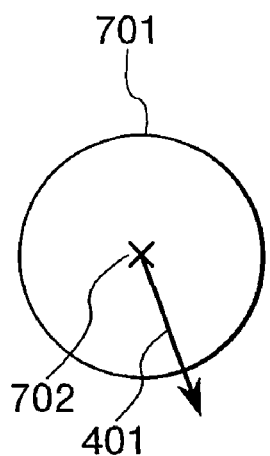
FIGS. 7A to 7E are partially enlarged views of an image presenting an environment parameter of a vector.
Figure 7B:
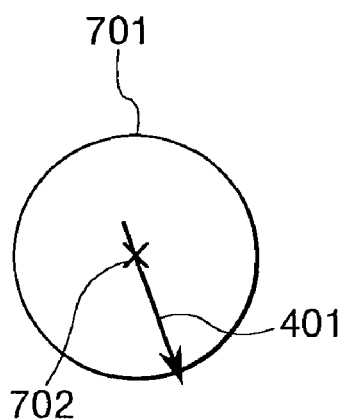
Figure 7C:
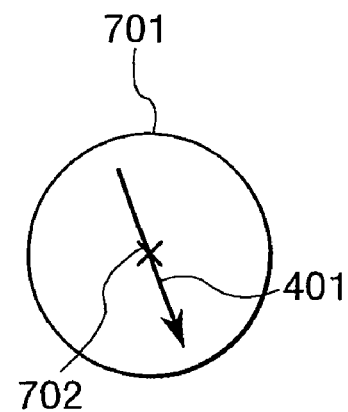
Figure 7D:
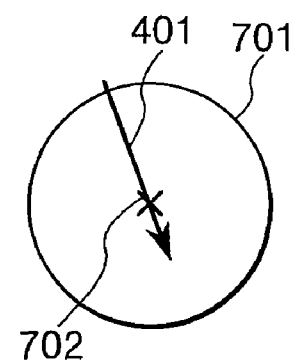
Figure 7E:
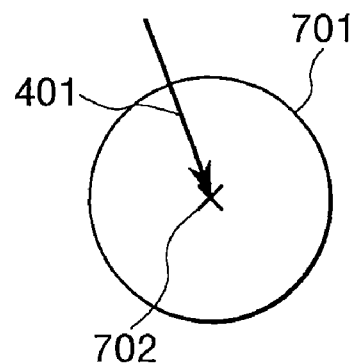

In FIG. 7A, the circle 701 is in a reference position (the position of a center 702 of the circle matches the starting point of the vector 401); in FIG. 7B, the circle 701 is shifted slightly in the direction of the vector 401; in FIG. 7C the circle 701 is shifted even further in the direction of the vector 401; and so on up to FIG. 7E.

Then, the frames of the dynamic image can be assigned in the order of FIG. 7A→FIG. 7B→FIG. 7C→FIG. 7D→FIG. 7E→FIG. 7A→FIG. 7B→FIG. 7C→FIG. 7D→FIG. 7E→ . . . , and the orientation of the vector 401 can be clearly expressed by creating a dynamic image wherein the circle 701 vibrates asymmetrically. Naturally, depending on the field of application, the vibration of the circle 701 may be made symmetrical as well.

(Flow of Control)

Figure 8:
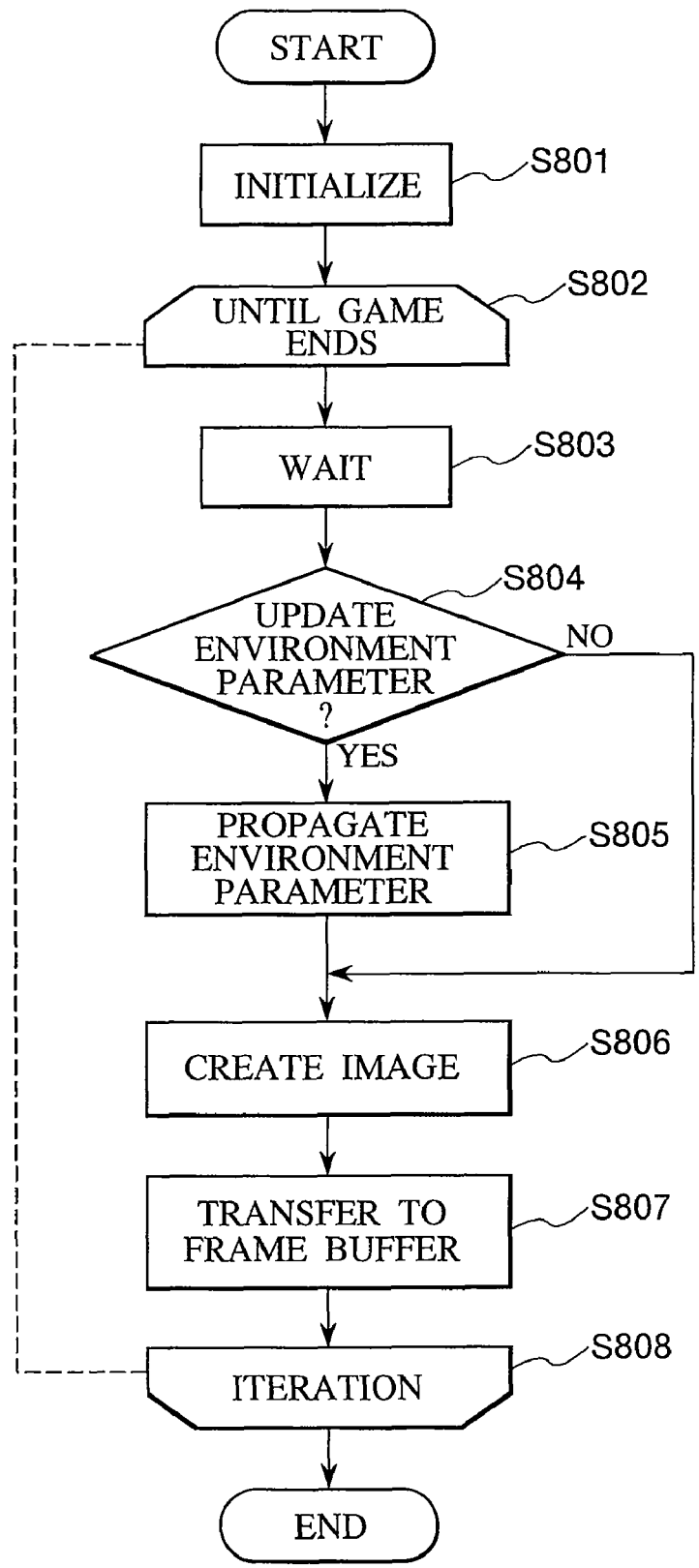
FIG. 8 is a flowchart showing the flow of control of the process executed in the image creating device of the embodiment.

While the details of the process executed by the image creating device 201 according to the embodiment are as described above, the following describes the overall process flow. FIG. 8 is a flowchart showing the flow of control of the process of the image creating device of the embodiment. A description is given below with reference to this drawing.

When the process is started, the CPU 101 initializes the environment parameter storage area of the array e[ ][ ], etc., prepared in the RAM 103 (step S801). Then, until the game ends, the following process is repeated (step S802 to step S808).

First, the CPU 101 waits until the next vertical synchronizing interrupt occurs (step S803). In standby mode, other processing may be routinely executed. The vertical synchronizing interrupt is a unit of time in which the image displayed on the screen of a television unit or the like is updated, and is typically approximately 1/60 second. In consequence, the time required for one unit of repetition of the process matches the cycle of vertical synchronizing interrupt occurrence.

Next, during this repetition, the environment parameter is propagated and the decision is made as to whether or not the value is to be updated (step S804). The process of propagation of the environment parameter is as described above, but is similar to the process of solving a so-called difference equation, sometimes resulting in a long calculation period. Here, a thinning-out process is suitably performed.

In a case where propagation is performed (step S804; Yes), the CPU 101, as described above, propagates the environment parameter stored in the RAM 103 so as to update the parameter (step S805), and proceeds to step S806. In a case where propagation is not performed (step S804; No), the CPU 101 proceeds to step S806 as is. With this arrangement, because the environment parameter is obtained in the RAM 103, the CPU 101 functions as the parameter acquiring unit 202 with the RAM 103.

Next, the CPU 101 refers to the environment parameter stored in the RAM 103, provides instructions to the image processor 107, and creates an image showing the environment parameter such as described above in the image buffer in the RAM 103 (step S806).

To display a dynamic image based on vibration as described above, the CPU 101 secures an area for maintaining the current phase per grid square 302 in the RAM 103. A "phase" refers to an amount that expresses the stage of the current cycle of vibration and, for example, conceivably increases little by little in FIGS. 7A to 7E.

Then, an image of the moment is created based on the phase. After an image is created, the product of a predetermined constant and the scalar parameter displayed by vibration is added to the phase of the grid square 302.

The created image is then transferred to the frame buffer (step S807), and repetition continues (step S808).

Thus, the CPU 101 functions as the image creating unit 203 with the RAM 103, the image processor 107, etc.

With such processing, one or a plurality of environment parameters distributed on the ground 301 of the virtual world can be presented simultaneously in an easy-to-understand manner to the player in units of grid squares 302, with the position of the character in focus at the center.

Note that the present application claims priority based on Japanese Patent Application No. 2006-093810, the contents of which are incorporated herein by reference to the fullest extent permitted by the law of the designated country.

INDUSTRIAL APPLICABILITY

As described above, according to the present invention, it is possible to provide an image creating device and an image creating method suitable for creating an image viewably showing the distribution of an environment parameter in a virtual space, a computer readable information recording medium storing a program for realizing these on a computer, and the program.

The invention claimed is:

1. An image creating device comprising:
a parameter acquiring unit that acquires environment parameters at a predetermined plurality of places in a virtual space; and
an image creating unit that creates an image based on the acquired environment parameters, wherein
the image creating unit creates, for each of the predetermined plurality of places in the virtual space, an image showing a graphic associated with an environment parameter at the place and drawn at a position within the image, the position being associated with the place,
each of the predetermined plurality of places in the virtual space is exclusively associated with one of a plurality of sections that divide the virtual space,
the parameter acquiring unit, for each of the predetermined plurality of places in the virtual space, acquires a direction of inflow and outflow of an environment parameter that flows in and out between neighboring sections for the sections associated with the place, and
the image creating unit creates as the image a dynamic image in which, for each of the predetermined plurality of places in the virtual space, the graphic vibrates in the direction of inflow and outflow of the environment parameter at the place based on the position within the image, the position being associated with the place.

2. An image creating device comprising:
a parameter acquiring unit that acquires environment parameters at a predetermined plurality of places in a virtual space; and
an image creating unit that creates an image based on the acquired environment parameters, wherein
the image creating unit creates, for each of the predetermined plurality of places in the virtual space, an image showing a graphic associated with an environment parameter at the place and drawn at a position within the image, the position being associated with the place, and
the image creating unit creates as the image a dynamic image in which, for each of the predetermined plurality of places in the virtual space, the graphic vibrates in a predetermined direction at a vibration amplitude associated with the environment parameter at the place, based on the position within the image, the position being associated with the place.

3. An image creating device comprising:
a parameter acquiring unit that acquires environment parameters at a predetermined plurality of places in a virtual space; and
an image creating unit that creates an image based on the acquired environment parameters, wherein
the image creating unit creates, for each of the predetermined plurality of places in the virtual space, an image showing a graphic associated with an environment parameter at the place and drawn at a position within the image, the position being associated with the place, and
the image creating unit creates as the image a dynamic image in which, for each of the predetermined plurality of places in the virtual space, at least either brightness or color of the graphic changes at either a vibration amplitude or time cycle associated with the environment parameter of the place.

4. An image creating method comprising:
a parameter acquiring step for acquiring environment parameters at a predetermined plurality of places in a virtual space; and
an image creating step for creating an image based on the acquired environment parameters, wherein
in the image creating step, for each of the predetermined plurality of places in the virtual space, an image showing a graphic associated with an environment parameter at the place and drawn at a position within the image, the position being associated with the place is created,
each of the predetermined plurality of places in the virtual space is exclusively associated with one of a plurality of sections that divide the virtual space,
in the parameter acquiring step, for each of the predetermined plurality of places in the virtual space, a direction of inflow and outflow of an environment parameter that flows in and out between neighboring sections for the sections associated with the place is acquired, and
in the image creating step, a dynamic image is created as the image in which, for each of the predetermined plurality of places in the virtual space, the graphic vibrates in the direction of inflow and outflow of the environment parameter at the place based on the position within the image, the position being associated with the place.

5. An image creating method comprising:
- a parameter acquiring step for acquiring environment parameters at a predetermined plurality of places in a virtual space; and
- an image creating step for creating an image based on the acquired environment parameters, wherein
- in the image creating step, for each of the predetermined plurality of places in the virtual space, an image showing a graphic associated with an environment parameter at the place and drawn at a position within the image, the position being associated with the place is created, and
- in the image creating step, a dynamic image is created as the image in which, for each of the predetermined plurality of places in the virtual space, the graphic vibrates in a predetermined direction at a vibration amplitude associated with the environment parameter at the place, based on the position within the image, the position being associated with the place.

6. An image creating method comprising:
- a parameter acquiring step for acquiring environment parameters at a predetermined plurality of places in a virtual space; and
- an image creating step for creating an image based on the acquired environment parameters, wherein
- in the image creating step, for each of the predetermined plurality of places in the virtual space, an image showing a graphic associated with an environment parameter at the place and drawn at a position within the image, the position being associated with the place is created, and
- in the image creating step, a dynamic image is created as the image in which, for each of the predetermined plurality of places in the virtual space, at least either brightness or color of the graphic changes at either a vibration amplitude or time cycle associated with the environment parameter of the place.

7. A non-transitory computer-readable information recording medium storing a program for controlling a computer to function as:
- a parameter acquiring unit that acquires environment parameters at a predetermined plurality of places in a virtual space; and
- an image creating unit that creates an image based on the acquired environment parameters, wherein
- the image creating unit creates, for each of the predetermined plurality of places in the virtual space, an image showing a graphic associated with an environment parameter at the place and drawn at a position within the image, the position being associated with the place,
- each of the predetermined plurality of places in the virtual space is exclusively associated with one of a plurality of sections that divide the virtual space,
- the parameter acquiring unit, for each of the predetermined plurality of places in the virtual space, acquires a direction of inflow and outflow of an environment parameter that flows in and out between neighboring sections for the sections associated with the place, and
- the image creating unit creates as the image a dynamic image in which, for each of the predetermined plurality of places in the virtual space, the graphic vibrates in the direction of inflow and outflow of the environment parameter at the place based on the position within the image, the position being associated with the place.

8. A non-transitory computer-readable information recording medium storing a program for controlling a computer to function as:
- a parameter acquiring unit that acquires environment parameters at a predetermined plurality of places in a virtual space; and
- an image creating unit that creates an image based on the acquired environment parameters, wherein
- the image creating unit creates, for each of the predetermined plurality of places in the virtual space, an image showing a graphic associated with an environment parameter at the place and drawn at a position within the image, the position being associated with the place, and
- the image creating unit creates as the image a dynamic image in which, for each of the predetermined plurality of places in the virtual space, the graphic vibrates in a predetermined direction at a vibration amplitude associated with the environment parameter at the place, based on the position within the image, the position being associated with the place.

9. A non-transitory computer-readable information recording medium storing a program for controlling a computer to function as:
- a parameter acquiring unit that acquires environment parameters at a predetermined plurality of places in a virtual space; and
- an image creating unit that creates an image based on the acquired environment parameters, wherein
- the image creating unit creates, for each of the predetermined plurality of places in the virtual space, an image showing a graphic associated with an environment parameter at the place and drawn at a position within the image, the position being associated with the place, and
- the image creating unit creates as the image a dynamic image in which, for each of the predetermined plurality of places in the virtual space, at least either brightness or color of the graphic changes at either a vibration amplitude or time cycle associated with the environment parameter of the place.

* * * * *